United States Patent [19]
Bhaumik et al.

[11] 3,761,838
[45] Sept. 25, 1973

[54] ROOM TEMPERATURE CO LASER
[75] Inventors: Mani L. Bhaumik, Pasadena; Don D. Diem, Lakewood; Michael M. Mann, Redondo Beach, all of Calif.
[73] Assignee: Northrop Corporation, Los Angeles, Calif.
[22] Filed: Sept. 11, 1970
[21] Appl. No.: 71,348

[52] U.S. Cl. .............................. 331/94.5, 252/372
[51] Int. Cl. ............................................. H01s 3/22
[58] Field of Search ................... 331/94.5; 252/372

[56] References Cited
OTHER PUBLICATIONS
Mann et al., Room Temperature CO Laser. Appl. Phys. Let. Vol. 16, No. 11 (June 1, 1970) pp. 430 and 431.

Primary Examiner—William L. Sikes
Attorney—Sokolski & Wohlgemuth

[57] ABSTRACT

A high efficiency, high power carbon monoxide laser continuously operable at room temperature utilizing as a gaseous mixture 0.50 to 5.0 torr of CO, 25 to 500 torr He, 2 to 50 torr $N_2$ and 0.010 to 2 torr of $O_2$ or NO. The efficiency of the laser at room temperature can be further improved by adding 1 to 5.0 torr xenon to the gaseous mixture. Additionally, the efficiency can be further improved by utilizing mercury vapor in the gaseous discharge.

6 Claims, 1 Drawing Figure

Patented Sept. 25, 1973
3,761,838
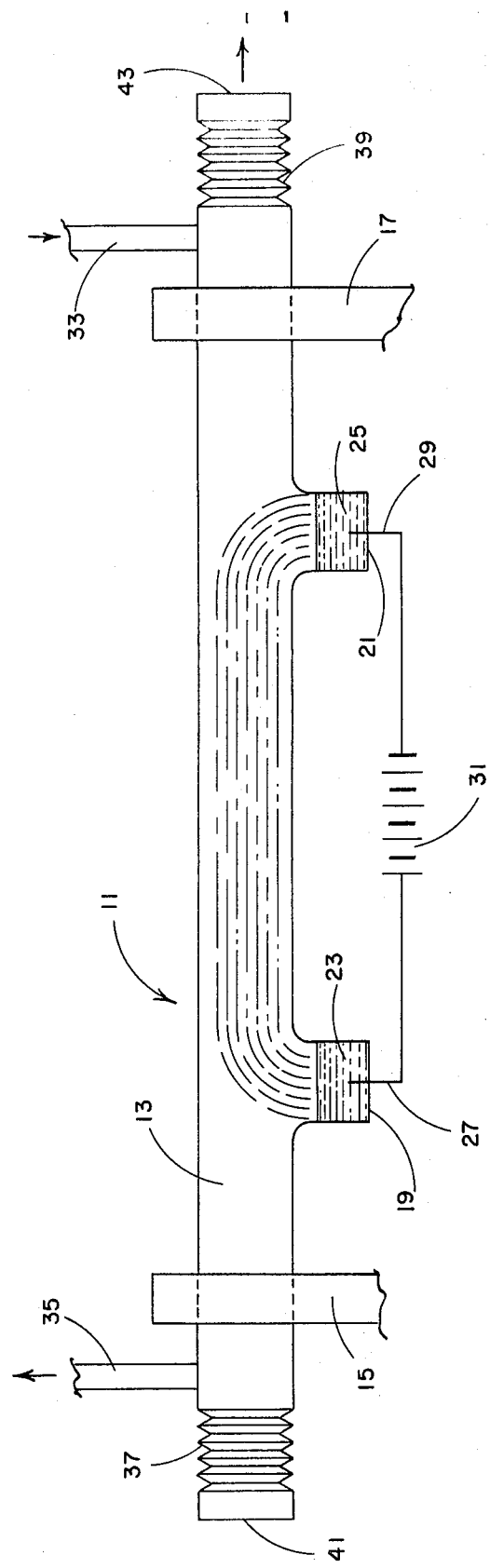

ROOM TEMPERATURE CO LASER

BACKGROUND OF THE INVENTION

1. Field of the Invention

This invention is in the field of gaseous lasers. More particularly the invention relates to improved carbon monoxide lasers.

2. Description of the Prior Art

There is considerable interest in the development of molecular gas lasers capable of delivering high efficiency and high output powers in the infrared region. The high efficiency of molecular lasers results from the fact that these lasers utilize transitions between vibrational-rotational levels of the electronic ground state giving rise to a minimum of heat loss. Since molecular lasers operated on transistions between closely-spaced, vibrational-rotational levels, the laser output can be obtained in a number of lines, actually more than 100 in some cases. Of the gaseous lasers, both the $CO_2$ and the CO molecular lasers are of interest because their output wave lengths are in the atmospheric transmission windows near 10 and 5 micron wave lengths respectively. Most of the prior work and study has been done with regard to the $CO_2$ lasers. Interest in the CO laser is a more recent development in that high efficiency and high power operation was not achieved until cryogenic temperatures had been utilized. As a result, the mechanism of the CO laser is not fully understood. It would appear that some of the processes involved in a high powered CO laser are different than those in the $CO_2$ though the gas mixtures and discharge conditions are similar in both cases.

If a CO laser is operated at room temperature, that is a temperature of 20°C±5°, there is a low power and low efficiency output. Thus not until it was discovered to operate the CO laser at cryogenic temperatures such as that of liquid nitrogen were high power and higher efficiencies obtained. However, the requirement for operating a CO laser at cryogenic temperatures is a severe drawback to its practical utilization. The overall system efficiency goes down because of the energy input required because of the additional power required to cool the cryogenics. Further, the use of the cryogenic material unduly complicates the handling and logistics problems of the laser. As a result the full potential of the carbon monoxide laser cannot be realized unless it is operable at room temperature with sufficient power and efficiency levels.

The cryogenic operation of this CO laser, was as indicated, a continuous discharge. The reported work in this area indicated the use of gaseous mixtures of $CO-He-N_2-O_2$ or air. The reported work utilized the various amounts of the aforegoing gases ranging from 0.1 to 0.6 torr of CO, 0.52 to 8.8 torr of He, 0.45 to 1.5 torr $N_2$, less than 0.025 torr of $O_2$ and the instance of utilization of air indicated a 1.4 torr thereof. In the pulse operated room temperature CO laser, it appeared that only 0.8 torr of CO was used and that no other gases were present in the laser. The result of this laser was an output that was in microwatts and thus totally insufficient for any practical purposes as has been indicated above.

In application Ser. No. 71,023 filed concurrently herewith by Bhaumik and Mann and assigned to the same assignee, there is disclosed a method of obtaining higher efficiency from a CO laser operated at room temperature by utilizing mercury electrodes or other means for discharging mercury into the gaseous mixture utilized. In that application, the gaseous mixtures utilized with the mercury fell within the range used for the continuous discharge CO laser operated at cryogenic temperatures. In other words the relative amounts of the gases in the mixture was generally in accordance with that previously taught and utilized. The herein invention is directed to another approach for obtaining satisfactory room temperature operation of CO laser. Since the herein method involves the utilization of relative amounts of gases in the mixture utilized, it can be further combined with the teaching of the copending application by incorporating mercury into the gaseous mixture and obtain even better results.

Briefly, the herein invention involves significantly increasing partial pressure of the individual gases comprising the mixture utilized in the CO laser. Unexpectedly, it was found that successful room temperature operation can occur in a water cooled laser utilizing a gaseous mixture having 0.50 to 5.0 torr CO, 25 to 500 torr He, 2 to 50 torr $N_2$, and oxygen in the range of 0.01 to 3 percent of the amount of CO present. Additionally, it has been found that NO can replace $O_2$ with successful results being obtained. The most significant aspect of the gaseous mixture as will be noted, is the greatly increased amount of helium being present over that previously disclosed or used. When xenon is added to the gaseous mixture, in amounts varying from 1 to 5 torr, further improvement in the efficiency is obtained at room temperature. Additionally, mercury vapor can be incorporated into the gaseous mixture to further improve efficiency in the manner disclosed in the aforementioned copending application.

It is believed that the invention will be further understood from the following detailed description in conjunction with the accompanying drawing, indicating conventional laser tube 11 apt for application of the subject invention.

Laser tube 11 will be understood by those skilled in the art as comprising a suitable carbon monoxide laser apparatus, including a soft glass cylindrical envelope 13 supported by end plates 15, 17 and inlet/outlet ports 33, 35 for admitting a gaseous mixture. Affixed to each end of the tube are flexible bellows 37 for length adjustment while a total reflector 41 and a partial reflector 43 are each disposed at the end of a respective bellows to facilitate the laser action, allowing the laser beam to be extracted at partial reflector 43, as well known in the art. A pair of liquid metal reservoir cavities 23, 25, together with associated electrodes 27, 29 and intermediate potential source 31, are provided for vaporizing and charging an added gaseous constituent of this tube (i.e. mercury), however, these are not relevant to the subject discussion and may be ignored. Further explanation and clarification on the subject figure may be found in U.S. Pat. No. 3,643,175 (see FIG. 1 thereof) by Bhaumik and Mann, assigned in common with the subject case to Northrop Corporation, and filed on 10 Sept. 1970; the relevant disclosure of which is incorporated by reference herein.

There appears to be significant unknown areas regarding the chemistry of CO during electrical discharges in the laser. However, it is postulated that the following components are expected in the CO discharge: C, O, $CO_2$, $C^+$, $C_2O$, and $C_3O_2$. Of the aforegoing, the expected stable products are $CO_2$, $C_3O_2$ and $O_2$. One of the most prevalent reactions believed to be occuring in the discharge is the following: $CO \rightleftarrows C+O$. It is felt that this reaction particularly tends to proceed toward the formation of C+O at room temperature operation of the laser. In order to increase the efficiency of the CO laser, it is necessary that the proper amount of CO be present in the gas. Thus, one of the purposes of the herein invention which results in achieving an improved efficiency of operation at room temperature is to shift the equilibrium in the above equation to provide CO during the discharge in the laser. It is believed that the results of the particular proportions of gases in the mixture utilized in accord with the present invention, help to prevent the shift in equilibrium toward the C+O while maintaining the proper amount of CO in the discharge, thus accounting for the increased efficiency.

In accord with the present invention the gaseous mixture in the laser will comprise from 0.50 to 5.0 torr of CO. Within this range it is preferred to utilize from 1.8 to 2.4 torr of CO. This increase in the amount of CO over that previously used provides for larger number of lasing molecules per c.c. within the laser tube. However, if nothing further was done by way, for example, of the herein invention, this increase in lasing molecules of the CO would have a tendency toward a higher rate of decomposition of the CO or disassociation of the CO, thus in the past it apparently was felt that the higher amount of CO could not be satisfactorily used though it would be desirable to obtain more lasing molecules because of the disassociation or decomposition problem attendant therewith. Thus, in fact, the herein invention allows the advantageous utilization of increased amounts of CO molecules without providing for the disadvantages attendant therewith.

The amount of $O_2$ present in the gaseous mixture should be on the order of 0.01 to 3 percent of the CO present, and preferably about 0.07 percent. It is believed that the addition of $O_2$ in the aforegoing range shifts equilibrium of the above reaction towards CO. The balance between the $O_2$ and CO is believed important. If there is not enough $O_2$ present then the desired shifting of the equilibrium will not be achieved to the degree preferred. If on the other hand there is too much $O_2$ then there will be a tendency to form $CO_2$ as a product. This will result in overall drop in output power in the laser at the desired output region of 5 microns at which a CO laser operates. Thus the interrelationship between the $O_2$ and CO, particularly, is important to the herein invention and forms a basis for permitting the improved efficiency and output at room temperature operation.

The gaseous mixture contains a significantly greater amount of helium than in the past CO laser gaseous mixtures as can be seen from the above description of the prior art. As indicated, the helium can vary from 25 to 500 torr and preferably between 50 and 100 torr. The helium is utilized to keep the kinetic temperature down since it has a high thermal conductivity and will serve to cool the gas.

The nitrogen present can vary from 2 to 50 torr and preferably between 12 and 15 torr. The function of the nitrogen is to absorb part of the energy and transfer it to the CO. This is tied to another advantage of the nitrogen wherein it prevents the decomposition of CO by interacting with energetic electrons whereupon it decomposes to N+N. When N+N recombine to form $N_2$ the energy of the recombination is transferred to the CO. To achieve the aforegoing results and assure the absorption of the energy, it is necessary to have, for example, up to six times more $N_2$ present in the gas than the CO thus accounting for such a significant increase in the amount of this gas in the mixture as compared to prior CO lasers where it has been utilized.

Thus as can be seen from the above discussion, the main function of the $N_2$, He, and $O_2$ or NO present in the gaseous mixture is to prevent the decomposition of the CO. It is believed that the improved results are obtained because there are more CO molecules present in the gseous discharge mixture than in prior lasers.

The results of the invention are even further improved by adding from 1.0 to 5.0 torr of xenon. Xenon performs two functions — firstly, it reduces the electron temperature to bring it to a level where more available electrons of a proper energy range are present which can be absorbed by the CO or $N_2$. Secondly, the xenon has a low ionization potential. In other words it requires less energy than the other components of the laser gas to ionize. It thus will preferentially ionize as compared to CO and serve to maintain the CO in that state and prevent its decomposition. Once again, the xenon can be seen to serve a function as the other gases in the amounts given in that the main objective in preserving the CO in the laser gas is achieved.

Additionally, the concept of the copending application utilizing mercury in the discharge stream can further give improved results and increases the efficiency of the CO laser.

The concept of the herein invention can be utilized both in axial flow lasers and in cross flow lasers. In a cross flow system where the gas travels normal to the axis of the laser tube a closed system is desirable and feasible with the recirculation of the gaseous mixture. To indicate the results of the herein invention, a laser tube was utilized made of quartz which was 166 cm long, having 126 cm between electrodes and an internal diameter of 2.5 cm. The central 116 cm of the tube was cooled by water flowing through a concentric outer jacket to maintain the desired operating temperature. External mirrors were employed together with sodium chloride Brewster windows. The optical cavity was formed by a 10 meter total reflector and an 85 percent reflecting flat with the peak reflectivity between 5 to 7 microns. The gaseous mixture for this laser was comprised of 50 torr He, 1.8 torr Co, 12 torr $N_2$, and approximately 2.2 torr $O_2$ resulting in a total pressure of 64 torr. An output of 10 W was obtained with a voltage of 14 kV and a current of 13 mA. This corresponds to an efficiency of 5.5 percent. When 2.5 torr of xenon was added to the above mixture an output power of 15 W was obtained with a voltage of 11 kV and current of 13 mA giving an efficiency of 10.5 percent. Utilizing the same mixture contained in xenon, an efficiency of up to 12.1 percent was obtained with a voltage of 9.2 kV and current of 22.5 mA having an output power of 25 W.

When the herein invention is utilized in combination with mercury, the laser tube will have two mercury pools with electrodes embedded therein to supply the mercury vapor within the tube. Utilizing the mercury, a mixture of 62.6 torr He, 2.4 torr CO, 15 torr $N_2$ and 0.056 torr $O_2$ totaling 80.056 torr was used. An efficiency obtained was 8 percent. Further addition of 2.5 torr xenon increased the efficiency to 17 percent.

We claim:

1. A gaseous composition of matter comprising:

0.50 to 5.0 torr CO
25 to 500 torr He
2 to 50 torr $N_2$
an amount of a gas selected from the group consisting of $O_2$ and NO equivalent to from 0.01 to 2 percent of the amount of CO.

2. The gaseous composition of claim 1 comprising:
1.8 to 5.0 torr CO
50 to 63 torr He
12 to 15 torr $N_2$
and an amount of a gas selected from the group consisting of $O_2$ and NO equivalent to about 0.07 percent of the amount of CO.

3. The composition of claim 1 further comprising:
1.0 to 5.0 torr of xenon.

4. In a method of generating a carbon monoxide laser at room temperature in a lasing tube under prescribed lasing conditions, the improvement therein which comprises introducing into the lasing tube a gaseous composition comprising:
0.50 to 5.0 torr CO
25 to 500 torr He
2 to 50 torr $N_2$
an amount of a gas selected from the group consisting of $O_2$ and NO equivalent to from 0.01 to 2 percent of the amount of CO.

5. The method of claim 4 wherein the gaseous composition comprises:
1.8 to 5.0 torr CO
50 to 63 torr He
12 to 15 torr $N_2$
and an amount of a gas selected from the group consisting of $O_2$ and NO equivalent to about 0.07 percent of the amount of CO.

6. The method of claim 4 further comprising adding from 1.0 to 5 torr xenon to the gaseous mixture used.

* * * * *